Patented June 7, 1949

2,472,119

UNITED STATES PATENT OFFICE 2,472,119

STABILIZATION OF BUTTER

William S. Mueller, Amherst, Mass., assignor to the United States of America as represented by the Secretary of War No Drawing. Application May 31, 1946, Serial No. 673,623

16 Claims. (Cl. 99—164)

The invention described herein, if patented, may be manufactured and used by or for the Government for governmental purposes, without the payment to me of any royalty thereon.

This invention relates to the stabilization of oleaginous substances, and more particularly to the stabilization, preservation, and retardation of oxidation and discoloration of butter products.

The great majority of oleaginous edible substances are subject to spoilage due to oxidation and consequent rancidity. Such substances are mixtures of glyceryl esters of aliphatic carboxylic mono-acids, at least one of said acids being unsaturated. The chemical reactivity caused by the unsaturation leads to oxidation and rancidity after relatively short exposure to air. This is particularly noticeable in the case of butter, which is a mixture of glyceryl esters of palmitic, butyric, caproic, capric, stearic and oleic acids, containing about 14% of water. Fresh butter has a pleasant flavor and an appetizing yellow color. After exposure to air at room temperature, the butter becomes rancid, which causes it to acquire a disagreeable taste and to change its color to a whitish shade. Butter fat, i. e., dried butter, is subject to deterioration in the same manner as butter, and the same is true of the butter oil (melted butter fat).

Numerous attempts have been to suppress or retard the oxidation of oleaginous edible substances, and particularly of butter products, by adding thereto natural or artificial preservatives; however, these attempts have not been successful heretofore, be it because of unpleasant taste imparted to the product by the stabilizing substance, or because of the harmful nature of the latter.

I have discovered that oleaginous edible substances are stabilized by adding thereto tetrachloro-para-benzoquinone, a substance used in the dyestuff industry under the name of chloranil. A small amount of this substance is sufficient to retard oxidation and discoloration of the edible product substantially, without prejudicing its wholesomeness or making it harmful for human consumption. I have found that the addition of even a small amount of tetrachloro-para-benzoquinone has particularly favorable results in the case of butter and its products.

It is thus an object of the present invention to stabilize oleaginous edible substances, such as butter and butter products.

Another object of the invention is a process for the prevention of discoloration of the above substances.

A further object is a butter product not subject to spoilage by contact with air due to oxidation and rancidity.

Another object accomplished by the present invention is a safe and wholesome food product which is easy to prepare without involved directions to food workers and without the necessity of subjecting the food product to temperature changes in the course of its manufacture.

These and other objects of my invention are readily apparent from the specification and appended claims.

It has been found that tetrachloro-para-benzoquinone, or chloranil, an organic compound having the formula

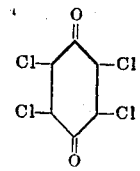

effectively retards oxidation and rancidity of oleaginous edible mixtures of glyceryl esters of aliphatic carboxylic mono-acids, of which at least one acid is unsaturated. A typical example of such edible glyceryl esters is butter, which contains 14% water and a mixture of glyceryl esters of butyric, caproic, capric, palmitic, stearic, and oleic acids; the unsaturation and consequent comparative instability of this mixture is caused by the double bond in the oleic acid ester. Butter fat and butter oil do not differ chemically from butter; butter fat is butter minus its water, and butter oil is melted butter fat. A small addition of tetrachloro-para-benzoquinone has the effect of preserving the appetizing yellow color of butter for a prolonged time due to its stabilizing antioxidant effect. It has further been found that this advantageous effect is accompanied by an addition of .05% or less of tetrachloro-para-benzoquinone, and that a food containing that amount of tetrachloro-para-benzoquinone is perfectly wholesome and harmless.

The following specific example illustrates the stabilizing effect of an addition of .05% of tetrachloro-para-benzoquinone to butter oil:

EXAMPLE

Two samples of fresh butter oil, one without an additive and the other with .05% by weight of tetrachloro-para-benzoquinone added thereto, were artificially aged at 100° C. in the dark. Once each day both samples received the same amount of agitation, and the color of the samples was compared to potassium dichromate standards, using a Lovibond tintometer. It was observed that the untreated sample of butter oil, which at the beginning of the test had a yellowish color corresponding to the color of a .1% solution of potassium dichromate, lost its color almost entirely after three to four days, corresponding in color to a .006% solution of potassium dichromate. The sample treated with tetrachloro-para-benzoquinone lost some of its color during the first five days, though not nearly as rapidly as the untreated sample; at the end of the sixth day, the treated sample still had a distinctive yellowish tint, corresponding to a .03% solution of potassium dichromate, and the same tint remained unchanged in the sample for the following twenty-six days. The experiment was terminated at the end of the thirty-first day. The thirty-one days of the experiment correspond to an exposure to air for several months at room temperature and without agitation. The results of the experiment are summarized in the following table:

*Color standard—per cent potassium dichromate*

| Days in Dark at 100° C. | Control—Nothing Added | Tetrachloro-Para-Benzo-quinone 0.05% |
|---|---|---|
| 0 | 0.10 | 0.10 |
| 1 | 0.10 | 0.10 |
| 2 | 0.08 | 0.07 |
| 3 | 0.03 | 0.05 |
| 4 | 0.006 | 0.04 |
| 5 | | 0.03 |
| 6 | | 0.03 |
| 7 | | 0.03 |
| 8 | | 0.03 |
| 9 | | 0.03 |
| 10 | | 0.03 |
| 14 | | 0.03 |
| 31 | | 0.03 |

While the foregoing example illustrates the application of a specific amount of tetrachloro-para-benzoquinone to a particular butter product, namely, butter oil, it is not meant to limit my invention thereby, which is equally applicable to the treatment of other butter products, such as butter or butter fat and, in fact, to all edible oleaginous glyceryl ester mixtures having as one component an unsaturated ester which renders the mixture liable to spoilage by oxidation.

Having thus fully described my invention, I hereby define its scope by the appended claims.

I claim:

1. A composition of matter comprising a butter product, and an antioxidative rancidity-retarding and decolorization-retarding stabilizing agent comprising tetrachloro-para-benzoquinone.

2. A composition of matter comprising butter, and an antioxidative rancidity-retarding and decolorization-retarding stabilizing agent comprising tetrachloro-para-benzoquinone.

3. A composition of matter comprising butter fat, and an antioxidative rancidity-retarding and decolorization-retarding stabilizing agent comprising tetrachloro-para-benzoquinone.

4. A composition of matter comprising butter oil, and an antioxidative rancidity-retarding and decolorization-retarding stabilizing agent comprising tetrachloro-para-benzoquinone.

5. A composition of matter comprising a butter product, and an antioxidative rancidity-retarding and decolorization-retarding stabilizing agent comprising tetrachloro-para-benzoquinone in an amount not exceeding .05% of the weight of said butter product.

6. A composition of matter comprising butter, and an antioxidative rancidity-retarding and decolorization-retarding stabilizing agent comprising tetrachloro-para-benzoquinone in an amount not exceeding .05% of the weight of said butter.

7. A composition of matter comprising butter fat, and an antioxidative rancidity-retarding and decolorization-retarding stabilizing agent comprising tetrachloro-para-benzoquinone in an amount not exceeding .05% of the weight of said butter fat.

8. A composition of matter comprising butter oil, and an antioxidative rancidity-retarding and decolorization-retarding stabilizing agent comprising tetrachloro-para-benzoquinone in an amount not exceeding .05% of the weight of said butter oil.

9. The process of stabilizing a butter product, comprising adding to said butter product an antioxidative rancidity-retarding and decolorization-retarding stabilizing agent comprising tetrachloro-para-benzoquinone.

10. The process of stabilizing butter, comprising adding to said butter an antioxidative rancidity-retarding and decolorization-retarding stabilizing agent comprising tetrachloro-para-benzoquinone.

11. The process of stabilizing butter fat, comprising adding to said butter fat an antioxidative rancidity-retarding and decolorization-retarding stabilizing agent comprising tetrachloro-para-benzoquinone.

12. The process of stabilizing butter oil, comprising adding to said butter oil an antioxidative rancidity-retarding and decolorization-retarding stabilizing agent comprising tetrachloro-para-benzoquinone.

13. The process of stabilizing a butter product, comprising adding to said butter product an antioxidative rancidity-retarding and decolorization-retarding stabilizing agent comprising tetrachloro-para-benzoquinone in an amount not exceeding .05% of the weight of said butter product.

14. The process of stabilizing butter, comprising adding to said butter an antioxidative rancidity-retarding and decolorization-retarding stabilizing agent comprising tetrachloro-para-benzoquinone in an amount not exceeding .05% of the weight of said butter.

15. The process of stabilizing butter fat, comprising adding to said butter fat an antioxidative rancidity-retarding and decolorization-retarding stabilizing agent comprising tetrachloro-para-benzoquinone in an amount not exceeding .05% of the weight of said butter fat.

16. The process of stabilizing butter oil, comprising adding to said butter oil an antioxidative rancidity-retarding and decolorization-retarding stabilizing agent comprising tetrachloro-para-benzoquinone in an amount not exceeding .05% of the weight of said butter oil.

WILLIAM S. MUELLER.

REFERENCES CITED

The following references are of record in the file of this patent:

UNITED STATES PATENTS

| Number | Name | Date |
|---|---|---|
| 2,349,771 | Horst | May 23, 1944 |

OTHER REFERENCES

Chem. Abs. vol. 37, 6032.